US008195704B2

(12) United States Patent
Kimmel et al.

(10) Patent No.: US 8,195,704 B2
(45) Date of Patent: Jun. 5, 2012

(54) VALIDATION AND CORRECTION IN A DISTRIBUTED NAMESPACE

(75) Inventors: Susan M. Kimmel, Wappingers Falls, NY (US); Scott T. Marcotte, Poughkeepsie, NY (US); Kershaw S. Mehta, Poughkeepsie, NY (US); Geoffrey E. Miller, Highland, NY (US); Mary Ng, Davis, CA (US); James M. Showalter, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 12/349,261

(22) Filed: Jan. 6, 2009

(65) Prior Publication Data
US 2010/0174752 A1 Jul. 8, 2010

(51) Int. Cl.
*G06F 17/30* (2006.01)
*G06F 17/001* (2006.01)
(52) U.S. Cl. ......... 707/796; 707/698; 707/821; 707/828
(58) Field of Classification Search ............. 707/609, 707/690, 694, 697, 705, 747, 791–792, 797–798, 707/803–804, 956, 698, 821, 827–829, 796; 709/215–220; 717/112–113, 115, 116, 119, 717/162, 165
See application file for complete search history.

(56) References Cited

U.S. PATENT DOCUMENTS

| 5,345,590 | A | * | 9/1994 | Ault et al. ...................... 718/1 |
| 5,537,574 | A | * | 7/1996 | Elko et al. ..................... 711/141 |
| 5,692,180 | A | * | 11/1997 | Lee ........................................ 1/1 |
| 5,758,339 | A | * | 5/1998 | Barton et al. ........................ 1/1 |
| 5,940,841 | A | * | 8/1999 | Schmuck et al. .................... 1/1 |
| 6,032,216 | A | * | 2/2000 | Schmuck et al. ............. 710/200 |
| 6,088,697 | A | * | 7/2000 | Crockett et al. .................... 1/1 |
| 6,339,793 | B1 | * | 1/2002 | Bostian et al. ................ 709/229 |

(Continued)

FOREIGN PATENT DOCUMENTS

WO  WO 03/065690  * 8/2003

(Continued)

OTHER PUBLICATIONS

T. Banks et al. "The evolution of CICA/ESA in the sysplex environment",IBM Systems Journal, vol. 36, No. 2, 1997, pp. 352-360.*

(Continued)

*Primary Examiner* — Srirama Channavajjala
(74) *Attorney, Agent, or Firm* — Cantor Colburn LLP; William A. Kinnaman, Jr.

(57) ABSTRACT

A method comprising, sending an instruction from a validator member of a sysplex to a second member of a sysplex to prevent operations that alter a sysplex namespace, determining whether the validator member of the sysplex is communicative with the second member of the sysplex and whether the members of the sysplex retain current sysplex status information, sending an instruction from the validator member to the second member to send a first namespace attribute data associated with the second member to the validator member responsive to determining that the validator member of the sysplex is communicative with the second member of the sysplex and the members of the sysplex retain current sysplex status information, determining whether the first namespace attribute data associated with the second member is consistent with a second namespace attribute data, and sending an instruction to correct the first namespace attribute data.

17 Claims, 6 Drawing Sheets

U.S. PATENT DOCUMENTS

| | | | |
|---|---|---|---|
| 6,408,298 B1 * | 6/2002 | Van et al. | 1/1 |
| 6,647,508 B2 * | 11/2003 | Zalewski et al. | 714/3 |
| 2002/0023070 A1 * | 2/2002 | Branch et al. | 707/1 |
| 2003/0126199 A1 * | 7/2003 | Kadri et al. | 709/203 |
| 2003/0145113 A1 * | 7/2003 | Pickel et al. | 709/245 |
| 2004/0172421 A1 | 9/2004 | Saito et al. | |
| 2005/0102297 A1 * | 5/2005 | Lloyd et al. | 707/100 |
| 2005/0165735 A1 * | 7/2005 | Lin et al. | 707/2 |
| 2005/0210033 A1 * | 9/2005 | Newcombe et al. | 707/10 |
| 2006/0116985 A1 | 6/2006 | Thind et al. | |
| 2006/0117056 A1 | 6/2006 | Havewala et al. | |
| 2007/0100855 A1 * | 5/2007 | T. Kohl | 707/101 |
| 2008/0301710 A1 * | 12/2008 | Shetty | 719/316 |

FOREIGN PATENT DOCUMENTS

| | | |
|---|---|---|
| WO | WO 2007/143712 | * 12/2007 |

OTHER PUBLICATIONS

Michael Hasenstein,The Logical Volume Manager (LVM),Whitepaper,SuSE Inc. © 2001, pp. 1-31.*

Jim ShowalterzFS Advanced Topics: New Support in zFS 1.11, IBM Corporation,Mar. 15, 2010, Session 2272, 25 pages.*

Jeffrey M NIck et al. "Overview of IBM system/390 parallel sysplex—A commercial parallel processing system", 1996 proceedings of IPPS, IEEE, pp. 488-495.*

Sombers Associates Inc and WH Highleyman, "the availability digest—parallel sysplex-fault tolerance from IBM", Apr. 2008, pp. 1-6.*

Chugman Seo et al. "Devs namespace for interoperable devs/soa", IEEE 2009, pp. 1311-1322.*

* cited by examiner

VALIDATION AND CORRECTION IN A DISTRIBUTED NAMESPACE

BACKGROUND

The embodiments relate generally to data processing and more specifically to accessing and storing data in a Parallel Sysplex multi-system.

Parallel Sysplex multi-systems use a number of systems having system processors in communication that read and write data stored in a data storage system (e.g., memory devices, direct access storage devices (DASD)). The multiple systems offer system redundancy such that if a particular system fails, other systems may perform similar tasks.

The data is organized hierarchically in file systems that are accessible by the system processors. In operation a file system is associated with a system processor that is designated the owner of the file system. The owner performs tasks associated with maintaining, accessing, reading and writing to the file system. Other system processors may be associated as clients of the file system. The clients may communicate with the owner to read, write, and perform other tasks related to the file system.

To properly manage the file system, the owner and client system processors should have accurate and current data on the ownership and client relationships of file systems stored in the a Parallel Sysplex multi-system.

SUMMARY

According to one embodiment, a method comprising, sending an instruction from a validator member of a sysplex to a second member of a sysplex to prevent operations that alter a sysplex namespace, determining whether the validator member of the sysplex is communicative with the second member of the sysplex and whether the members of the sysplex retain current sysplex status information, sending an instruction from the validator member to the second member to send a first namespace attribute data associated with the second member to the validator member responsive to determining that the validator member of the sysplex is communicative with the second member of the sysplex and the members of the sysplex retain current sysplex status information, determining whether the first namespace attribute data associated with the second member is consistent with a second namespace attribute data, and sending an instruction to correct the first namespace attribute data.

According to another embodiment, a method comprising, receiving an instruction to correct an inconsistent first namespace attribute data associated with a second member of a sysplex, sending an instruction from a validator member to the second member of the sysplex to send a list of file systems associated with a sysplex communication error to the validator member, determining whether the inconsistent first namespace attribute data corresponds to a sysplex communication error, and sending an instruction including corrected first namespace attribute data to the second member of the sysplex responsive to determining that the first namespace attribute data corresponds to a sysplex communication error.

According to another embodiment, a system comprising, a validator member of a sysplex operative to send an instruction to a second member of the sysplex to prevent operations that alter a sysplex namespace, determine whether the validator member of the sysplex is communicative with the second member of the sysplex and whether the members of the sysplex retain current sysplex status information, send an instruction to the second member to send first namespace attribute data associated with the second member to the validator member responsive to determining that the validator member of the sysplex is communicative with the second member of the sysplex and that the members of the sysplex retain current sysplex status information, determine whether the first namespace attribute data associated with the second member is consistent with second namespace attribute data, and send an instruction to correct the first namespace attribute data responsive to determining that the first namespace attribute data associated with the second member is not consistent with the second namespace attribute data.

DETAILED DESCRIPTION

Systems and methods involving Parallel Sysplex multi-systems are provided. Several exemplary systems and methods are described.

Figure 1:
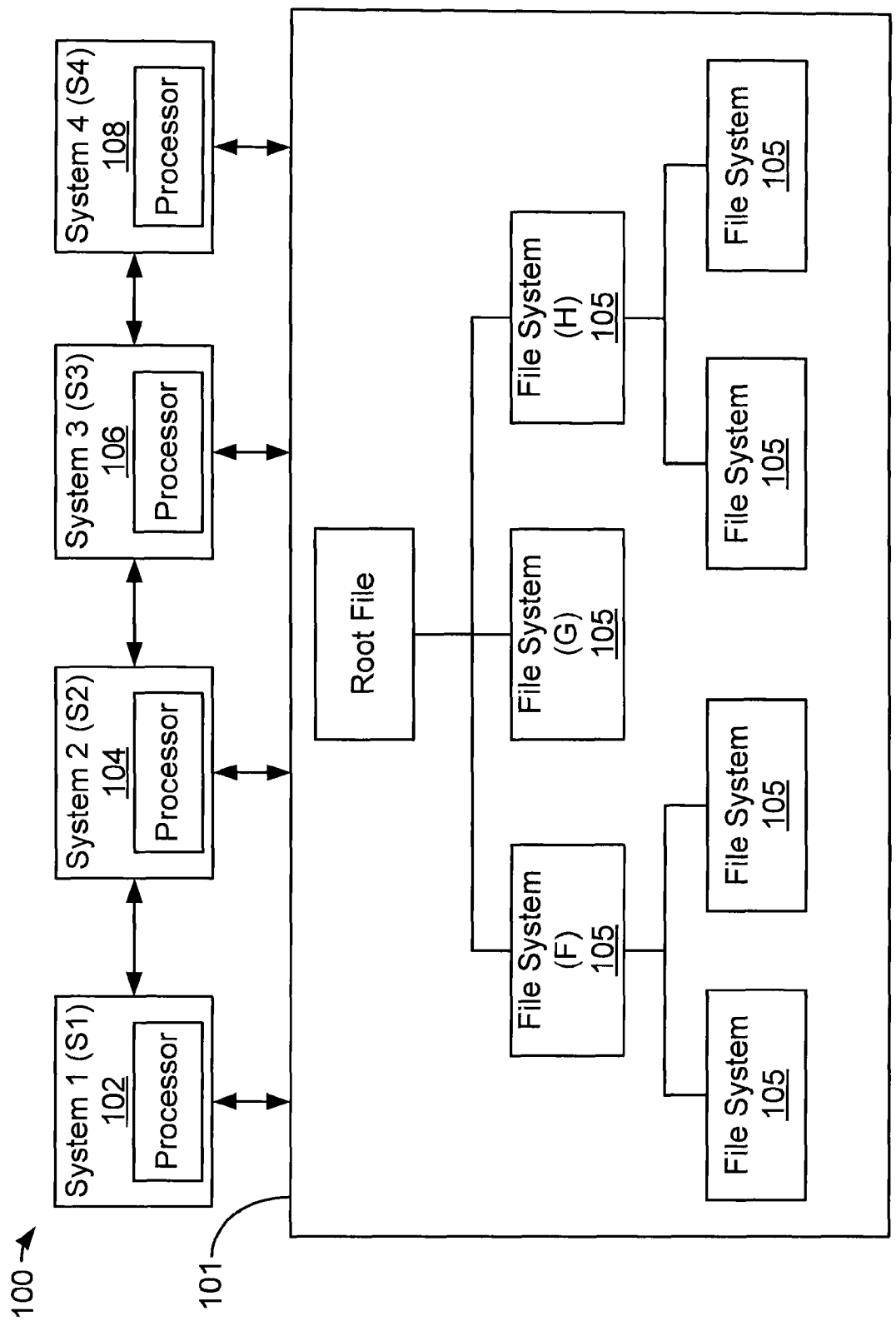
FIG. 1 illustrates an example of a Parallel Sysplex multi-system.

FIG. 1 illustrates an example of a Parallel Sysplex multi-system (sysplex) 100 having sysplex members system 1 (S1) 102, system 2 (S2) 104, system 3 (S3) 106, and system 4 (S4) 108 that include processors. The sysplex 100 includes a file system tree 101 having a plurality of mounted file systems 105. In operation, when a file system 105 is mounted to the file system tree 101 the file system 105 is associated with an owner system, and if desired, one or more client systems. Clients "connect" at file system mount time to the owner to exchange information so the clients may send file requests (read, write, mkdir, etc. . . . ) to the owner for a desired file system. The owners of the file systems are stored in global resource serialization (GRS) that is a distributed system lock and resource manager; the owner of the file system obtains an enqueue on a file system name to indicate it owns the associated file system. Thus, GRS may be queried to find the owner of the file system from any system. Unix systems typically include a logical file system (LFS) layer and a physical file system (PFS) layer. The embodiments are implemented in International Business Machines (IBM) z/OS Operating System. The logical file system layer in z/OS is called Unix System Services (USS) and the physical file system is zSeries File System (zFS).

USS and the administrator control which sysplex members a file system is primarily mounted on. USS may provide mounts for the same file system on multiple systems. For sysplex aware systems, a member is able to successfully access the DASD the file system resides in for the mount to be successful. Thus a member "caches" a file system if the member received a mount request for the file system from USS and the request was successful. A client system un-caches the file system when the file system has no successful local mount, and an owner system un-caches the file system when no sysplex member has a local mount for the file system.

Parallel Sysplex systems are designed to recover from a failure of a member; for example, if the owner of a file system goes down, another member takes ownership of the file system to ensure access is not lost. In some instances (such as lost DASD access) no member can assume file system ownership; in such a case the file system is left unowned until a system member assumes ownership. Ownership may be transferred based on usage statistics to ensure the most active system owns the file system.

Figure 2A:
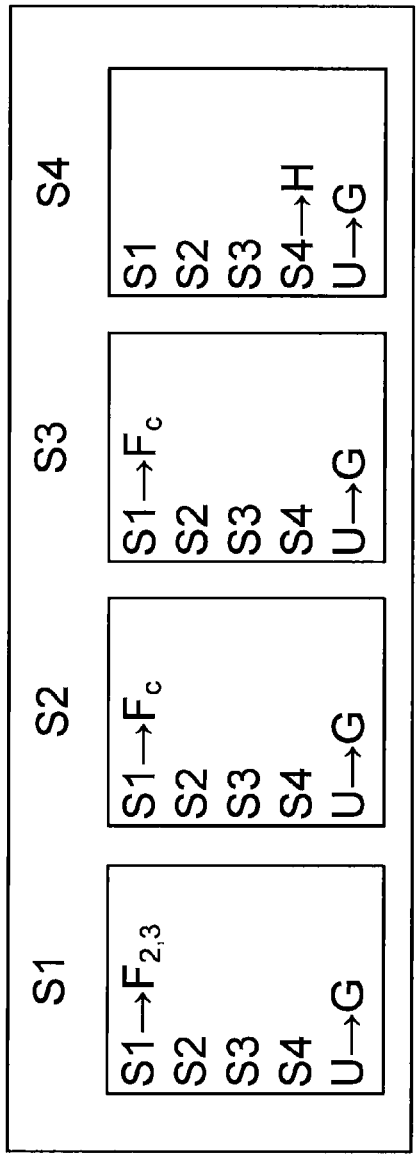
FIGS. 2A and 2B illustrate examples of file system ownership arrangements in a sysplex.
Figure 2B:
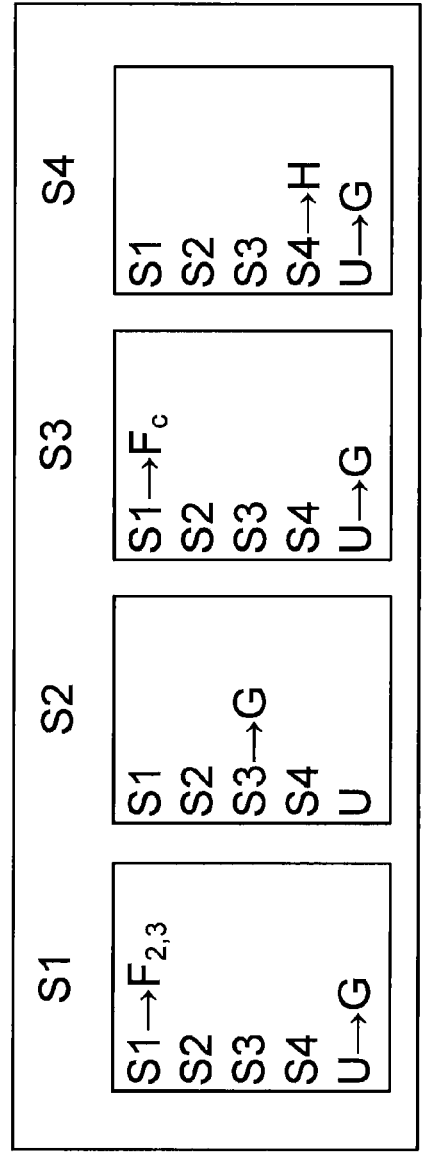

FIGS. 2A and 2B illustrate examples of file system ownership arrangements in a four member sysplex. Referring to FIG. 2A, the sysplex includes three file systems F, H, and G that are consistently distributed as a namespace. System 1 (S1) owns the file system F, and associates systems S2 and S3 as clients. S2 and S3 associate S1 as the owner of F. File system H is only mounted on S4, and thus S4 is the only system that caches information associated with H. File system G is mounted on all of the systems, but is unowned (U). There may be a number of causes for a lack of ownership of G, for example, another sysplex member is not operating that was the owner of G, and the ownership has not been transferred to another system. The namespace of FIG. 2A is consistent because the systems (S1, S2, S3, and S4) agree that S1 is the owner of F, and S1 agrees with S2 and S3 that S2 and S3 are clients. Regarding G, all of the systems agree that G is unowned, and H is only owned by S4 and the other systems do not have conflicting entries for H.

Referring to FIG. 2B, FIG. 2B illustrates an example of an inconsistent namespace. In the illustrated example, S1 associates S2 and S3 as clients of F, however S2 has neither a local mount for F, nor information associated with F. S2 has associated S3 as the owner of G; however S1, S3, and S4 associate G as being unowned. If the inconsistencies in FIG. 2B remain uncorrected, F could not be fully unmounted from the sysplex because S1 would not unmount F. Regarding G, users of systems S1, S3, and S4 would receive errors if the users desired access to G.

The inconsistencies of FIG. 2B may occur if communication failures or timeouts occur between systems when file systems are mounted or unmounted. For example for G, if S3 owned G and was in the process of transferring ownership of G, S3 first sends a message to the other systems to move G to the unowned list. If the message is not received by S2, the other systems may move G to the unowned list, but S2 may keep G as being owned by S3. A result is file corruptions and lost file system access.

The agreement of ownership and client associations of file systems is one element in maintaining a consistent sysplex. Other elements include agreement on whether or not zero or more clone snapshots exist for a file system, agreement on a state of a file system (for example, whether a file system is quiesced, which means user activity is temporarily halted sysplex-wide, and reasons for a quiesce, such as whole-file-system backup or ownership movement), and agreement on processing attributes of a file system (for example, low-space monitoring and dynamic file system growth).

Figure 3:
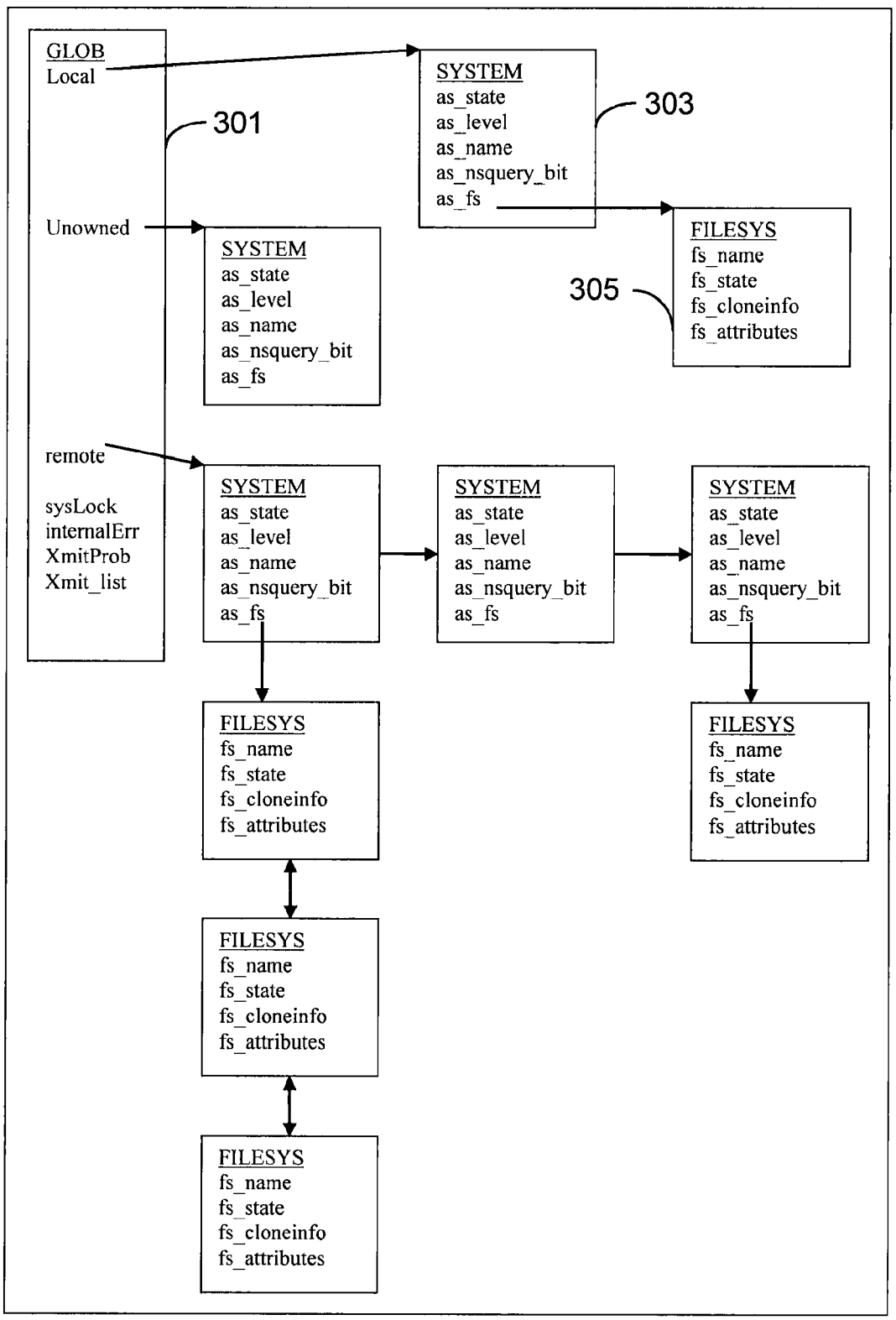
FIG. 3 illustrates a block diagram of an example of cached data structures of a sysplex.

FIG. 3 is a block diagram of an example of the cached data structures that may be used to maintain the status of sysplex member systems and file systems. The data structures may be used to maintain the sysplex namespace in memory. The block 301 represents program global storage including the fields Local, Unowned, and Remote. Local addresses a SYSTEM structure that represents the local sysplex member. Unowned addresses a SYSTEM structure that represents the "unowned" system, and anchors the list of currently unowned file systems. Remote addresses a list of SYSTEM structures representing each sysplex member that has joined the group at one time or another, even if the member is not currently part of the group. Other fields include sysLock, InternalErr, XmitProb, and Xmit_list. The field sysLock is a local system lock to protect updates to the structures. InternalErr may be set if the local system suspects a possible namespace consistency error with another member. XmitProb is set if the local system had problems communicating with another member. Xmit_list is an anchor to the list of file systems that encountered a transmission failure for an administration command that was being processed against the systems on the local system. (I.e., the local system knows the file systems may have an inconsistency in the namespace due to communications problems.)

Block 303 represents a member system in the sysplex, and includes the fields as_state, as_level, as_name, as_nsquery_bit, and as_fs. The as_state field represents a state of the system, and may include one of the following: AS_DOWN if the member is down, AS_READY if member is up and active in the sysplex, AS_PARTIALLY_DOWN if the member is down, and the local system has received notification from XCF (XCF is the z/OS layer of code that handles system-down notification and system partitioning of members that are in a failed state) that the member is down, and the local system has frozen user activity for file systems originally owned by the down member and moved file systems for that member to the unowned list. The field as_level indicates the software level supported (i.e., if read-write sysplex file system sharing supported). The field as_name indicates the name of system. The field as_nsquery_bit is a number assigned to the system during the namespace retrieval portion of validation. The field as_fs is an anchor to list of file systems owned by the sysplex member.

Table 1 in the appendix area below includes examples of administration commands that may be used in the exemplary methods.

Prior to correction of file system inconsistencies, the inconsistencies are detected (validated). Namespace validation is integrated as part of the initialization process; any new member performs a validation to ensure its starting in a consistent namespace. Since a new member is uncorrupted (its namespace is empty) the new member is a preferred system to perform a correction. A correction is performed when a member leaves the sysplex, either normally or abnormally. A validation check is automatically scheduled by the system any time an unexpected error occurs while communicating with another sysplex member; for example, if a communication failure occurs, or if an unexpected error is received from the remote member. A validation check may also be run at any time and on any sysplex member (it does not matter which member initiates the command as the member's full sysplex validation) via the z/OS system operator command: F ZFS, NSV.

For serialization GRS is used as a sysplex lock manager. The administration commands (of Table 1) may use the following example GRS enqueues for serialization: IOEZNS and IOEZTM.filesysname. Administration commands such as MOUNT, UNMOUNT, file system ownership movement, quiescing for backup, etc., obtain the IOEZNS resource in shared mode and obtain the file system resource in exclusive mode. Validation obtains the IOEZNS resource in exclusive mode, hence when validation is running no other administration commands may run. No new system may join the sysplex and new systems wait when they attempt the GRS enqueue on IOEZNS. Timeouts on the enqueue are used to prevent unbounded waits. Initialization uses IOEZJOIN as the GRS enqueue for serialization of a new system joining the XCF group. All newly arriving members obtain the lock when joining and also obtain IOEZNS when members join the sysplex since the members perform a namespace validation.

Although no new administration commands may run during a validation and correction, systems could go down during the namespace extraction process. The work required when a system goes down is processed during a validation. XCF sends a notification when members go down, and each active member stops any user activity to file systems owned by the member that went down. (In the above example (of FIG. 2A), if system S1 goes down, systems S2 and S3 stop user activity for file system F and move F to the unowned list, later on, one of the systems may attempt to assume ownership).

The initialization routine includes calling XCF to query a current member group portion, to join the group and perform a namespace validation. An example of the initialization routine is described in Table 2 in the appendix area below.

The validation routine, called NSValidate, is called during initialization, for the F ZFS,NSV command, when a subroutine receives an unexpected message or message reply return code, or experienced a communication failure on a message that is used to update the sysplex namespace.

Figure 4:
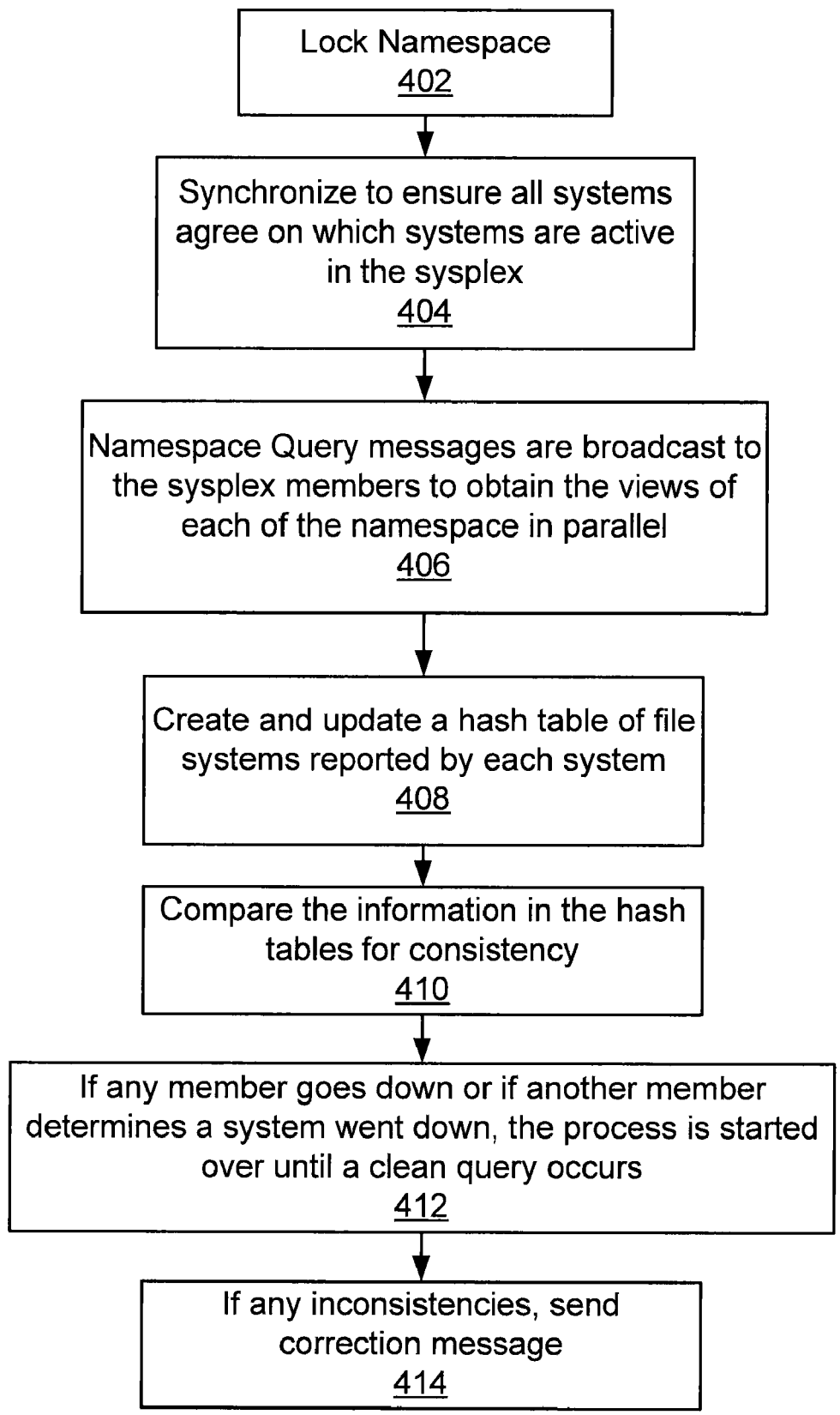
FIG. 4 illustrates a high level block diagram of an example of the validation algorithm.

FIG. 4 is a high level block diagram of an example of the validation algorithm. In block 402, the IOEZNS resource is held in exclusive mode that prevents any other administration related operations that may alter the namespace, including other validation commands. Hence the namespace is "locked" over the operation. In block 404, the validating system provides a list of the systems the validating system assumes are ready to the other sysplex members, and synchronizes with other systems to ensure all systems agree on which systems are active in the sysplex. In block 406, the Namespace Query (NSQUERY) messages are broadcast to the sysplex members to obtain the views of each of the namespace in parallel. Each system has different information in the cached namespace of the system since each member has a different view of the namespace (for example, a file system may not be mounted on all sysplex members and the view of a file system for an owner is not the same as a view of a client to the file system). In block 408, the validating system creates and updates a hash table of file systems reported by each system. Each hash table has the same number of rows, and thus a file system F is hashed in the same row for each hash table corresponding to each member who has a mount for that file system. The state, the owner, which systems are clients (owner system), if the client is connected (client system), and attributes are returned for each file system known by each member. In block 410, the validating system compares the information in the hash tables for consistency. In block 412, if any member goes down or if another member determines a system went down, the process is started over until a clean query occurs with no members going down. In block 414, if not consistent the validating system performs correction.

If there were any communication failures in any validation or correction message, validation restarts from the beginning. The validating system warns the operator and "pings" each system to ensure that the validating system is communicative with the system, if the validating system cannot communicate, the validating system informs the operator which system is experiencing a communications problem. The operator may investigate or terminate a problematic member. An example of the NSValidate routine is shown in Table 3.

Figure 5:
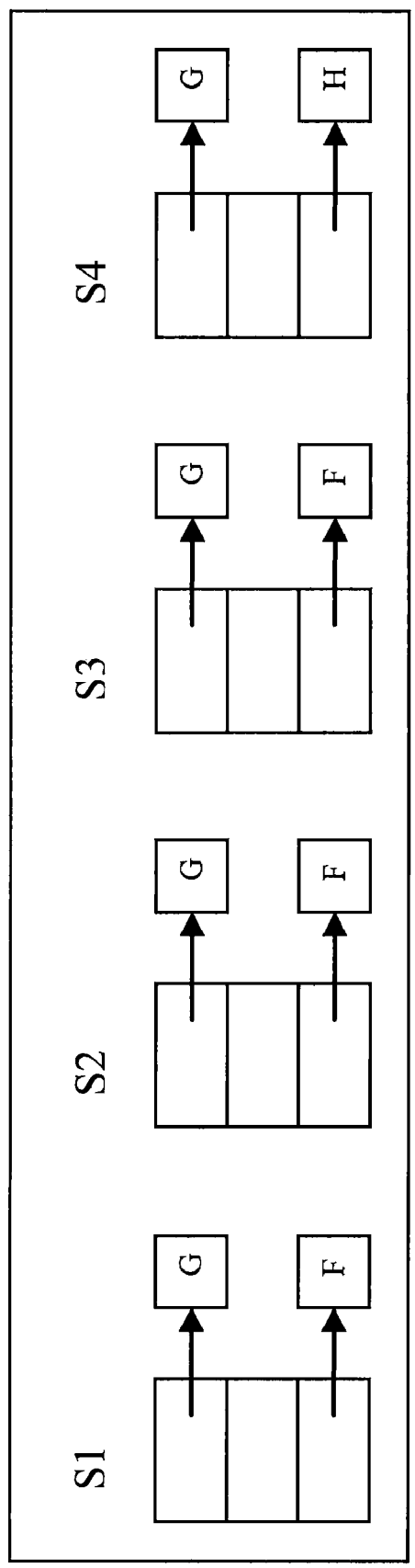
FIG. 5 illustrates an example of hash tables that may be generated in a namespace query of the systems shown in FIG. 2A.

FIG. 5 illustrates an example of hash tables that may be generated in a namespace query of the systems shown in FIG. 2A. If validation creates, for example, hash tables with 3 rows, and file systems F and H hash to row 2 of the table, and G hashes to row 0 of the table, the resultant hash tables that are created in the validating system storage as part of the namespace query process that is used to check for consistency are shown in FIG. 5. Each entry in the hash table contains the file system state, attributes and an identifier of the owner (according to the system represented by the hash table). If a system considers itself the owner, the system will include a bitmask that indicates which systems the system considers are clients of the file system. Each system is assigned a bitmask position and lists of connected clients may be succinctly represented.

The SynchronizeReadySystems routine communicates with other members and ensures agreement on which systems are up. An example of the SynchronizeReadySystems routine is shown in Table 4.

The rcv_syncready routine is called at the target system of a SYNCREADY message. The routine compares the senders ready system list to the view of ready systems maintained by the receiver, and wait for system down notification for any member the sender acknowledges is down while the local system is unaware of the down system. An example of the rcv_syncready routine is shown in Table 5.

The Retrieve namespace routine takes as input the ready_systems list from the caller (NSValidate) and validates and corrects the namespace. If any transmission failures occurred the routine returns an indication to NSValidate that a transmission failure occurred, NSValidate warns the administrator, and initiates the wait/ping process and restarts the routine. An example of the Retrieve_namespace routine is shown in Table 6.

The send_nsquery routine broadcasts an NSQuery message to all systems that still have entries in their namespace that have not been returned to the validating system. Since each system may have a different number of file systems in the system namespace, the number of transmits and replies may be different for each system. An example of the send_nsquery routine is shown in Table 7.

The sh_compare_tables routine is called by retrieve_namespace after the namespace has been retrieved from all sysplex members. The routine indicates whether the namespace is consistent. An example of the sh_compare_tables routine is shown in Table 8. An example of name space attribute data for an inconsistent namespace is shown in C programming language in Table 9.

Once validation is complete the namespace may be corrected. If the corruption is due to a communications failure, there are certain types of corruptions that are expected. During the correction process the validation member obtains the list of file systems from each member that includes each file system that had a corruption and communication errors. The type of corruption is analyzed to determine if the corruption fits a profile of a corruption that may occur due to communication failure or message timeout. If the corruption fits the profile, then a correction routine fixes the problem by communicating the appropriate correction to any member that has incorrect information in the member namespace.

If a corruption does not fit the profile, than one or more members have a corruption that a member did not detect. In a case where validation detects a corruption, then one or more members have corruptions that were not self detected. If the number of members with a corruption is less than or equal to the threshold MIN(2, number of active sysplex members), the members that have a corruption are restarted. If the number of members having an inconsistency is greater than the threshold, USS is called to internally re-mount the file system (an example re-mount includes: stop user file activity against the file system, UNMOUNT the file system sysplex-wide, MOUNT the file system sysplex-wide, and resume user activity).

Figure 6:
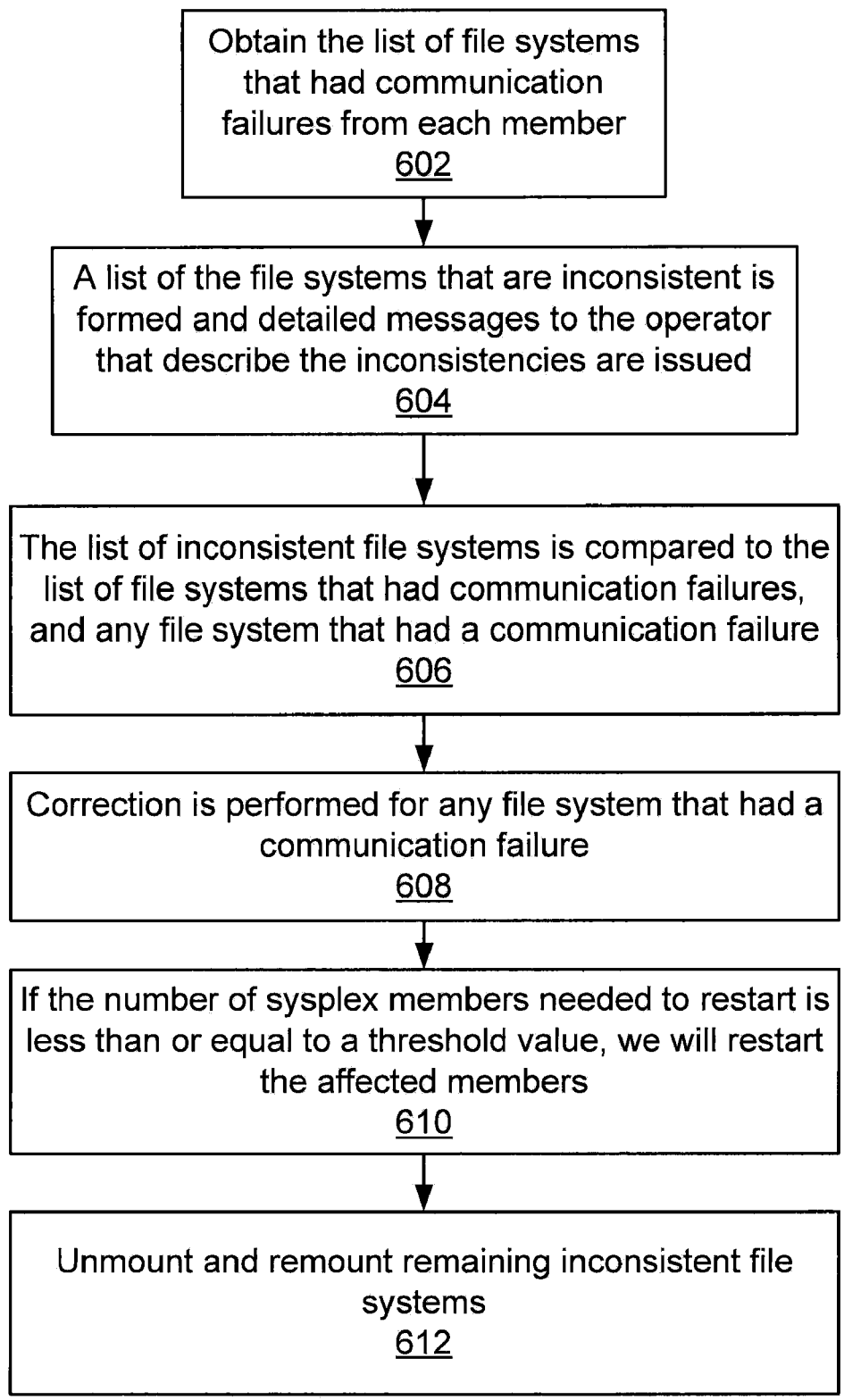
FIG. 6 illustrates a high level block diagram of the correction algorithm.

FIG. 6 illustrates an exemplary high level block diagram of the correction algorithm. In block 602, obtain the list of file systems that had communication failures from each member. The validator (the system that is performing the validation) processes a full list of the file systems that might have an inconsistency among sysplex members where no internal problem caused the inconsistency. In block 604, the namespace that was extracted during the validation step is re-examined, communicating with GRS to ensure that zFS information matches GRS information. A list of the file systems that are inconsistent is formed and detailed messages to the operator that describe the inconsistencies are issued. In block 606, the list of inconsistent file systems is compared to the list of file systems that had communication failures, and any file system that had a communication failure and whose inconsistency matches what would be expected for a communication failure is marked "communication failure consistent." Examples of types of inconsistencies for a communication failure include: an owner has a connection for another system, but the system does not register that the systems have a connection; a client of a file system may register that the file system is quiesced and the owner does not register that the file system is quiesced; one or more members may register that a file system is owned while other members register that the file system is unowned; a client may register incorrect information related to a file system snapshot.

In block 608, correction is performed for any file system that had a communication failure (after this step, file system inconsistencies due to internal error remain) for example: connection problems—instruct owner to remove any extra connection the owner has for clients that do not have connection; state problem—instruct any client that has the file system in a quiesced state to unquiesce the file system; ownership issue—instruct any system that does not have the file system marked unowned, to move the file system to the unowned list; snapshot issue—send any client with wrong snapshot information the correct snapshot information to allow the client to save the correct snapshot information.

In block 610, if the number of sysplex members needed to restart (based on the inconsistencies found) is less than or equal to the maximum members that are allowed to be restarted (a threshold value), the affected members are restarted. The system picks up validation and correction when the system restarts itself. If any system is restarted (zFS is restarted on the members. The USS layer routes file requests to another system until zFS is restarted. Once zFS is restarted, the USS presents the restarted zFS with mounts) a new validation is performed.

In block 612, the remaining file systems that have inconsistencies that cannot be corrected by restarting (since the number of systems with inconsistencies is greater than the restart threshold). In this case, confirmation that the inconsistent file systems are removed from all zFS address spaces via a remount of the file system is obtained, the following example of processing may be used for each file system: communicate to all systems and instruct the systems to check if the USS has registered that the systems presented a MOUNT of the file system to the local zFS. If the member registers a cache entry for the file system but USS does not register that the file system is locally mounted, the zFS member performs a forceful purge of any and all structures related to that file system from all of its caches; communicate to any member that still has a cache entry for the file system to unquiesce the file system (in case it is quiesced); issue an osi_ctl(remount) instruction to instruct the USS to unmount and re-mount the file system in the same mode. When each zFS receives the un-mount, the zFS performs a forceful purge of each internal structure related to the file system. Thus, when the MOUNTs arrive for the file system to the individual sysplex members, the sysplex members start with clean caches for the file system.

If correction is desired, a list of file systems that have communication failures is compiled. The list includes file systems from all systems in the sysplex and is used to determine what correction is applied. If communication problems are encountered while compiling the list, the validation process is restarted. Once a validation is completed, each system in the sysplex clears the list of file systems with communication failures. The send_getxmit_fail routine is called from retrieve_namespace after sh_compare tables is completed. The send_getxmit_fail routine returns an updated list of file systems with communication failures; and returns an indicator of whether communication problems were encountered sending the GET_XMITFAIL message. An example of the send_getxmit_fail routine is shown in Table 10.

The temporary hash tables are processed to create a list of file systems with inconsistencies using a get_fs_list routine. The file systems are analyzed, one at a time, across all hash tables. There is one hash table for each system participating in validation. Each hash table contains an NS_ITEM entry for a file system; if the associated system contains a cache entry for the file system, i.e., if the file system is mounted on the system. The NS_ITEM is a structure that contains the state of the file system with respect to the particular file system. The inputs to the get_fs_list routine are the temporary hash tables array and the ready_systems array. The outputs are the address of a list of inconsistent file systems, an update of the temporary hash tables to include only inconsistent file system entries; and temporary hash table entries with information related to bad clones is removed. An example of the get_fs_list routine is shown in Table 11.

For each inconsistent file system F with xmit_fail set, the inconsistencies are analyzed to ensure there are no inconsistencies due to internal errors using the trim_xmit_failure routine. The xmit_fail is reset if inconsistencies due to internal errors are found. The inputs to the trim_xmit_failure routine are the updated temporary hash tables array, the ready_systems array, and the list of inconsistent file systems, L. The output is the xmit_fail flag is reset for any file system F, in L, if the inconsistency is not commensurate with communication failures. An example of the trim_xmit_failure routine is shown in Table 12.

Before starting the correction all systems in the ready_systems list are checked to ensure that the ready systems are still up using the check_down_systems routine. An example of the check_down_systems routine is shown in Table 13.

Once the list of file systems with inconsistencies is compiled, and the temporary hash tables contain only entries for the inconsistent file systems, and the up systems are verified, the inconsistencies may be corrected using a correct_namespace routine. The inputs to the correct_namespace routine are the temporary hash tables array, the ready_systems array and the list of inconsistent file systems, L. The outputs of the correct_namespace routine are corrected file systems, restarted systems, and remounted file systems. An example of the correct_namespace routine is shown in Table 14.

If a system is determined to be down in one of the above routines, a system down notification may be sent. When the system down notification is received, a system down routine may be run to accommodate the loss of a system. An example of the system_down routine is shown in Table 15.

The technical effects and benefits of the above-described systems and methods provide an efficient automated method for validating and correcting file systems in a distributed namespace, eliminating the need for human intervention to correct problems, or restarts of the entire sysplex. The methods provide excellent first-failure data capture and provides an efficient means for responding to communication failures that does not leave users hanging indefinitely and provides proper notification to system operators of problems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

TABLE 1

Administration Commands

1. MOUNT—Mounts a file system in the tree of file systems. Is first presented to one member (that becomes owner) and catchup-mounts are broadcast to other members who CONNECT to the owner to notify that they are clients.
2. UNMOUNT—Un-mounts a file system in the tree of file systems. Presented in any order. Client systems will DISCONNECT from owners and when the last system has processed its un-mount the owner will close the file system.
3. QUIESCE (for backup)—Stops write activity sysplex-wide to a file system. Owners coordinate the command by sending QUIESCE (for backup) messages to clients.
4. CLONE—Creates a clone (a backup of the file system on disk) of the primary file system. The owner coordinates the command by telling clients to QUIESCE (for clone/delete) which stops all user activity sysplex-wide. It creates the clone and sends a CLONE message to clients to indicate there is now a new clone of the file system. The owner then sends an UNQUIESCE message to tell clients to resume user activity.
5. DELETE—Similar clone, however the clone is deleted.
6. UNQUIESCE (for backup)—The opposite of quiesce, the owner sends UNQUIESCE messages to clients to resume user activity. (A backup program would call zFS to QUIESCE the file system, make a backup and then call zFS to unquiesce the file system).
7. FSMOVE—A move of ownership from the original owner to a new owner. The original owner sends a QUIESCE (for movement) to clients and they stop user activity, and then the original owner sends an UNOWNED message to clients so they move the file system to an unowned state (no owner). At this time the file system is unowned. The new owner then sends a START_TAKEOVER message to ensure other sysplex members agree that the new owner can indeed proceed, and then a TAKEOVER message to tell the clients it is indeed assuming ownership, and they will move the file system from their unowned list to the new owner SYSTEM list. Then send other messages not related to the namespace and finally will send an UNQUIESCE message to clients to allow user activity to resume.
8. GROW—Grows a file system. Communicated to other members so that the file system is not unmounted while growing. The owner sends a GROW_START message before it grows the file system and sends a GROW_STOP message when the grow completes. User activity is not stopped (not required) during this process.
9. When an owner of a file system is off line, all other sysplex members will move the file systems of the down-system unowned list and stop user activity against the file system. The sysplex members then race to become owners of the file systems by attempting to obtain the required serialization (see below) and then perform the START_TAKEOVER . . . sequence described for FSMOVE.

TABLE 2

Initilization

1. Enqueue IOEZJOIN resource in exclusive mode (ensures at most one system initializing in the sysplex at a time).
2. Call XCF to query which systems are active members of the zFS group (shows which members of the sysplex are up and running the zFS software, systems are fully initialized since only one system (this system) can be initializing or terminating at a time), provides a list of system names for active members.

TABLE 2-continued

Initilization

3. Call XCF to join the zFS group.
4. For each member that is part of the XCF group (the list provided in step 2):
   a. Create a SYSTEM structure for the member in the local cache and add it to the remote list.
   b. Call XCF to establish a communication connection with the target member.
   c. If step 4b was successful, mark the as_state as AS READY in the member's SYSTEM structure, else mark it AS_DOWN.
   d. → Send a JOIN message to the target member to exchange protocol information and software level information.
      i. ← The recipient of the message will do:
         1. Lock its local sysLock.
         2. Create a SYSTEM structure for the sender (if one does not exist) and mark them AS_DOWN and save the software release level.
         3. Release local sysLock.
         4. Return the recipient's software support/level.
   e. If the target went down then continue with next member (a down member means our task became easier, less members to initialize with).
   f. Save target members software support/level. (The software support indicates if read-write sysplex mount sharing supported for example).
5. Call NSValidate to perform namespace validation and to complete the initialization sequence.

TABLE 3

NSValidate

1. If not already done, Enqueue IOEZJOIN resource in exclusive mode. (Note that initialization has already performed this step, so this is skipped for initialization but this routine is called any time a validation is needed).
2. Enqueue IOEZNS ressource in exclusive mode. (This ensures only one validation at a time in a sysplex and makes administration commands like MOUNT, UNMOUNT, etc. . . . wait). The namespace is thus frozen.
3. Lock sysLock in write mode.
4. Count number of items in remote list, let N = count of items in remote list.
5. If called by initialization, obtain a ready-systems list array of N items (local system is not up yet) else obtain a ready-system's list array of N + 1 items (local system is already up). This list is simply an array of system names. In z/OS, each system name is a maximum of 8 characters.
6. If internalErr or XmitProb set (the local system detected a possible zFS software on one or more members of the sysplex or it encountered a transmission failure on a message which updates the namespace on another sysplex member) then issue a message warning the system operator that namespace validation is running due to an encountered error.
7. Fill in ready_systems lists based on which SYSTEM structures in the remote list are marked ready, let ready_count = current number of active systems. (Note that the systems can go down during validation and so the list can shrink)
8. If XmitProb then do:
   a. Broadcast a PING message to all ready sysplex members (this is just a "hello, how are you message").
   b. If any system failed to reply:
      i. Issue a message showing which system had a failure
      ii. Pause a short time
      iii. Goto step 6.
9. Call SynchronizeReadySystems to communicate with other members and ensure agreement on which systems are up. The ready_systems list is passed as input and output is an indication of success or failure (transmission error occurred).
10. If a transmission error occurred, set XmitProb and go to step 6.
11. Call retrieve_namespace to obtain the sysplex namespace, validate it and correct it. The ready_systems list is passed as input and output is an indication of whether a transmission problem occurred.
12. If a transmission error occurred, set XmitProb and go to step 6.
13. Clear the InternalErr and XmitProb flags (the namespace has been validated and corrected) and the Xmit_list.
14. Broadcast an NSV_Complete message to the other pled members, they will simply clear their InternalErr, XmitProb indicators and their Xmit_list.

TABLE 3-continued

NSValidate

15. If called by initialization then return (initialization will have more work to do not related to this invention).
16. Release sysLock.
17. Release IOEZNS
18. Release IOEZJOIN
19. Free ready_systems list storage.
20. Return.

TABLE 4

SynchronizeReadySystems

1. Scan the remote systems list and update the input ready_systems list so it correctly reflects what members of the sysplex the local system considers ready.
2. Loop for each remote member name in the ready_systems list:
   a. Release sysLock.
   b. Transmit a SYNCREADY message to the member. The local system's ready_systems list is transmitted to the target member so it can compare it to its local cache.
      i. ← The member will reply with an indication of any members it knows are DOWN that the sender did not know about.
   c. Lock sysLock in write mode. (the lock that protects the local namespace cache is normally released over transmissions to prevent deadlock).
   d. If the target system coincidentally went down, wait for any system-down processing for that member to be completed (system-down processing means that XCF called zFS with a group-user indication and zFS stops any user activity against file systems owned by that member and moves those file systems to the unowned list).
   e. If the target member returned the name of a system it knows is down but whose name was in the ready_systems list passed to them:
      i. Wait for system-down processing for the returned member name.
3. Again scan the remote systems list and create a new ready_systems list based on which systems are considered ready.
4. If the list in step 3 does not match the list obtained in step 1, go to step 1.
5. Return an updated ready_systems list to the caller. (At this point, all other members agree on which systems are active in the sysplex).

TABLE 5 rcv_syncready

1. Lock sysLock in write mode.
2. Check that sender is still alive and message is valid for processing (sender did not go down after it transmitted message).
3. Scan list of systems in the remote list on the local system, if any are marked ready that are NOT in the list provided by the sender:
   a. Wait for system down notification from XCF and the processing associated with it (file system movement to the unowned list).

TABLE 5-continued rcv_syncready

4. Scan list of systems in the remote list on the local system, if any are marked not-ready that ARE in the list provided by the sender:
   a. Return the name of the first system found in the reply packet to the sender.
5. Release sysLock.
6. Transmit reply packet to the sender.

TABLE 6

Retrieve_namespace

1. Set variable try_again = 0.
2. Obtain an array of hash table pointers (described above and shown in FIG. 4), one for each ready system in the ready_systems list.
3. Obtain an array of 8 byte cookies, one for each ready system in the ready_systems list. Each system has a different namespace and if the namespace is large, may make multiple calls to the system to retrieve the namespace and the recipient of the NSQuery message will return a cookie to be passed on a subsequent call (this indicates where to resume in the namespace listing).
4. Obtain an array of return codes (qcode), one for each system to track which systems may have encountered an error during the query.
5. Obtain an array of reached_end flags, indicating when a particular system has returned its last item in its namespace. Essentially, since each system has a different sized namespace, and since the NSQuery is broadcast to each sysplex member, some systems may have completed the query while others will require additional NSQuery messages to obtain more of the namespace. This is used to keep track of which systems have completed and which have not, to know which systems to broadcast future NSQuery messages to.
6. Create an array of SYSTEM pointers (ready_sysp), one for each system name listed in the ready_systems list.
7. Clear hash table pointer array.
8. Loop:
   a. Make sure every system listed in ready_systems list is still considered AS_READY by local system. If not then go to step 8f.
   b. Create an empty hash table (that contains the NS_ITEMS shown above) for each system in the ready_systems list.
   c. If there are no other ready systems (the local system is the only system in the sysplex), set ended = 1, else set ended = 0.
   d. While (ended = 0 and there are ready remote systems) do:
      i. Call send_nsquery to broadcast an NSQuery packet to all members in the ready_systems list that has more entries to return. Input is the ready_systems list. Input/Output parameters are the cookie array and the qcode array, and an array of reply buffers, one from each system of their flattened namespace.
      ii. If a transmission failure occurred, go to step 8f
      iii. For each system ready_systems[i] in the ready_systems list that has a corresponding reached_end[i] value of 0 (the system has more entries in its namespace):
         1. If the corresponding system returned a system-down error code in its reply (qcode[i] from the NSQuery message, goto step 8f (The target system noticed a member went down).
         2. Take the file systems listed in the reply packet for the system and add them to the corresponding hash table for that system. Thus an NS_ITEM is added to the appropriate hash row for each file system listed in the reply packet, the entries in the reply packet are essentially NS_ITEM structures themselves, so it's creating a hash table from a flat buffer of records.
         3. If the returned cookie[i] for that system indicates no more entries (zFS uses a cookie of −1 to represent that) set the reached_end[i] = 1.
      iv. If all reached_end[ ] values are 1 for each ready system, set ended = 1.
   e. Scan the ready_systems list and ensure each system is still ready, if they are then BREAK from the main loop.
   f. Delete any hash tables and all entries in those hash tables created from previous steps.
   g. Call synchronize_ready_systems to serialize with other systems and update the ready_systems list to reflect which member (or members) went down during the validation process.
   h. If a transmission failure occurred during synchronize_ready_systems, return (so NSValidate can notify operator of problem).
9. Fill in the ready_sysp array so there is a 1-1 correspondence between the name in ready_systems list and the SYSTEM pointers in ready_sysp array. Additionally a special entry for the "unowned" system, hence the SYSTEM structure for

TABLE 6-continued

Retrieve_namespace unowned file systems is added to the lists since some file systems in the namespace could be unowned.
10. Call sh_compare_tables to compare the namespace as known by each system for consistency. This function essentially returns an indication if the namespace is consistent or not. It will remove file systems from the hash table that are found consistent and stop processing as soon as it finds an inconsistent file system in the namespace.
11. If sh_compare_tables indicated the namespace is inconsistent:
    a. Call send_get_xmitfail to obtain the list of file systems from each member and add those names to the local Xmit_list. Thus after this step, the local Xmit_list has the list of ALL file systems that had an administration command that encountered a communication failure during its processing. These file systems are expected to possibly be inconsistent in the namespace and does not necessarily represent a zFS software error.
    b. Call get_fs_list to continue where sh_compare_tables left off. It will essentially create a list of file systems that are inconsistent.
    c. Call trim_xmit_failure to take the bad file system list and indicate which file systems that have an inconsistency of the type expected for a communication failure.
    d. If any file system has an inconsistency NOT commensurate with a communication failure, take a dump of zFS storage on all sysplex members so the problem can be reported to IBM service.
    e. PING each system in the ready_systems list to ensure communication with the system. Since the sysLock is never held across message transmits, a system-down notification can be presented during the PING. Thus if a system goes down or there are communication problems, need to return to the caller (NSValidate) so it can retry validation.
    f. If the PING failed for one or more members or a system went down, set try_again = 1 and goto step 12.
    g. Call correct_namespace to perform the namespace correction.
    h. Set try_again = 1
12. Free hash table storage and bad file system list storage.
13. Free any bad file systems listed by get_fs_list.
14. If try_again then goto step 16
15. (At this point the namespace is consistent). If called for initialization:
    a. Transmit a READY message to each system in the ready_systems list.
        i. ← Each recipient will mark the sender SYSTEM state to AS_READY.
    b. (Hence, at this point the new system is considered ready in the sysplex, it validated the namespace and has officially joined the sysplex).
16. Free any remaining storage obtained in steps 2-5.
17. If try_again = 1 then GOTO step 1.

TABLE 7 send_nsquery

Input/Output of the routine is:
1. ready_systems list of systems to send to.
2. An array of reply buffers for each system.
3. Updated qcode array indicating the return code of the reply from each system.
4. And cookie array which is the resume cookie returned be each member.

Algorithm:
1. Format a packet to broadcast to each sysplex member. This packet includes:
    a. The ready_systems array which lists all systems the sender thinks are ready in the sysplex.
    b. The cookie array, even though each system has its own unique cookie, the entire array of cookies is broadcast to each member (to essentially allow a single broadcast, each system locates its cookie upon receipt of the common packet).
2. Release sysLock
3. Broadcast the NSQuery message to all systems in the sysplex that have not returned a cookie value of −1 already. Wait for all replies to arrive from the members.
4. Lock sysLock in write mode.
5. Update cookie and qcode arrays based on the reply each system made.

Recipients of NSQuery message follow these steps:
1. Scan the input ready_systems list in the incoming packet for the name that matches the recipients system and save the position p.

TABLE 7-continued send_nsquery

2. Use the corresponding cookie, in position p of the cookie array in the input packet.
3. Check to ensure that the recipient's view of ready systems matches the input ready_systems list the caller provided. If it determines there is a mismatch it returns an error so the validating system will know it will need to call synchronize_ready_systems to ensure agreement of sysplex members on which systems are ready in the sysplex.
4. The caller then uses the input cookie to determine where to continue in its namespace query. The cookie is an 8 byte value, the first 4 bytes indicate which SYSTEM structure left off with in its namespace cache, and the second 4 bytes indicates which file system owned by the indicate SYSTEM to begin with. <0,,0> means to start at the beginning, and a returned value of <−1,,−1> (or −1 if using a 64 bit machine word) indicates the scan is complete.
5. Obtain a 90K buffer to contain the list of file systems.
6. Loop, starting with first SYSTEM identified by cookie:
    a. Loop starting with each file system identified by cookie owned by the identified SYSTEM:
        i. Convert the information from the FILESYS structure into a flattened NS_ITEM-style representation.
        ii. If there is no more room in the buffer the break from BOTH loops.
7. Update output cookie to where left off, or <−1,,−1> if processed the rest of the namespace.

TABLE 7-continued send_nsquery

8. Transmit reply back to sender.
9. Free reply buffer storage.

TABLE 8 sh_compare_tables

1. If not called on behalf of initialization, create an NS_ITEM hash table for the local system (the local system is initialized and hence also has a namespace cache).
2. Obtain storage for a ready_item array, whose entries correspond 1-1 with the systems in the ready_systems list. This array points to the corresponding NS_ITEM the system reported during the query process and represents that system's view of the file system.
3. For each system s, in the ready_systems list (including the UNOWNED system), loop:
    a. For each row r of the hash table corresponding to system s, loop:
        i. Loop processing each file system F in the hash row r:
            1. Find the SYSTEM structure that represents the owner of the file system, and then the corresponding index o in the ready_systems list of the file system that owns the aggregate. This is the owner index into the arrays.
            2. Loop for each other hash table (not s):
                a. Searching for same file system F in their corresponding hash row r, if it exists then save the corresponding NS_ITEM address in the ready_item array that corresponds 1-1 with the ready_systems list.
                b. Verify that all systems agree on the owner, if not then return error.
            3. If the owner index o does not represent the unowned system (hence the file system is indeed owned):
                a. Ensure that the owner system actually thinks they own the file system, if not then return error.

TABLE 8-continued sh_compare_tables

4. If the file system is mounted R/W, and the owner system does not support multi-system read-write mounts, ensure that only one system has an entry in its local namespace for file system F.
5. If the file system is only mounted on one sysplex member:
    a. If the owner thinks any other system has it mounted then return error (hence owner has non-zero connection bitmasks in its NS_ITEM).
    b. Goto step 9
6. For each system that has file system F in its local namespace:
    a. Make sure their misc. attributes and file system state are identical. (If a system went down during a clone, and the file system is currently unowned, the other systems may have clone information that is out of date. It is remedied when a system assumes ownership of the file system). If not consistent, return error.
7. If the file system F is unowned:
    a. Ensure no system thinks it is the owner, or are connected, hence a client, of some owner system. If not consistent then return error.
    b. Goto step 9
8. For each system that is not the owner of the file system:
    a. Make sure that if the owner thinks the client is connected to the file system (or its clone) that the client systems consider themselves connected. If not consistent then return error.
9. Remove the NS_ITEM for file system F from all hash tables as it is now viewed as consistent.
4. Free the ready_item array storage.
5. Return success, the namespace is consistent.

TABLE 9

```
typedef struct badfs_t {
    struct badfs_t *next;
    int owner_index;              /* Index in ready_systems array of owner */
    NS_ITEM *owner_itemp;
    int first_index;              /* Index in ready_systems array of first system with
                                     an entry for this system */
    NS_ITEM *first_itemp;         /* Address of NS_ITEM of first system with entry for
                                     file system in its namespace */
    int slotnum;
    int errflag;
#define OWNER_MISMATCH            0x80000000  /* owner on client does not match owner on owner */
#define BAD_OWNER                 0x40000000  /* cache entry on owner missing or has bad owner pointer */
#define SYSADMIN_MULTIPLE_FS      0x20000000  /* multiple cache entries for fs owned by sysplex admin */
#define UNOWNED_GROWING           0x10000000  /* growing flag set for unowned fs */
#define RW_MISMATCH               0x08000000  /* RW flag on owner and client do not match */
#define HASBAK_MISMATCH           0x04000000  /* hasbak flag on owner and client do not match */
#define GROWING_MISMATCH          0x02000000  /* growing flag on owner and client do not match */
#define DYNMOVE_MISMATCH          0x00800000  /* dynmove flag on owner and client do not match */
#define NODYNMOVE_MISMATCH        0x00400000  /*
```

TABLE 9-continued

```
nofynmove flag on owner and client do
                                    not match */
#define MONITOR_MISMATCH            0x00200000 /*
monitor flag on owner and client do
                                    not match */
#define GROW_MISMATCH               0x00100000 /* grow
flag on owner and client do not
                                    match */
#define NBS_MISMATCH                0x00080000 /* nbs
flag on owner and client do not
                                    match */
#define CURSTATE_MISMATCH           0x00040000 /*
curstate on owner and client do not
                                    match */
#define FSSTATE_MISMATCH            0x00020000 /*
fsstate on owner and client do not
                                    match */
#define BAKSTATE_MISMATCH           0x00010000 /*
bakstate on owner and client do not
                                    match */
#define THRESHOLD_MISMATCH          0x00008000 /*
threshold on owner and client do not
                                    match */
#define INCREMENT_MISMATCH          0x00004000 /*
increment on owner and client do not
                                    match */
#define MOVEPCT_MISMATCH            0x00002000 /*
movepct on owner and client do not
                                    match */
#define MOVEINT_MISMATCH            0x00001000 /*
moveint on owner and client do not
                                    match */
#define MOVEMIN_MISMATCH            0x00000800 /*
movemin on owner and client do not
                                    match */
#define FSTOKID_MISMATCH            0x00000400 /*
fstokid on owner and client do not
                                    match */
#define BAKTOKID_MISMATCH           0x00000200 /*
baktokid on owner and client do not
                                    match */
#define FSID_MISMATCH               0x00000100 /* fsid
on owner and client do not match
                                    */
#define BAKID_MISMATCH              0x00000080 /* bakid
on owner and client do not
                                    match */
#define FSDEVNO_MISMATCH            0x00000040 /*
fsdevno on owner and client do not
                                    match */
#define BAKDEVNO_MISMATCH           0x00000020 /*
bakdevno on owner and client do not
                                    match */
#define FS_OWNERCONN_CLIENTNOCONN   0x00000010 /* owner
connect bit on but client flag
                                    off */
#define FS_OWNERNOCONN_CLIENTCONN   0x00000008 /* owner
connect bit off but client flag
                                    on */
#define BAK_OWNERCONN_CLIENTNOCONN  0x00000004 /* owner
connect bit on but client flag
                                    off */
#define BAK_OWNERNOCONN_CLIENTCONN  0x00000002 /* owner
connect bit off but client flag
                                    on */
#define FS_OWNERCONN_NOCLIENT       0x00000001 /* owner
connect bit on but no client
                                    cache entry or client
                                    down */
    int errflag2;
#define BAK_OWNERCONN_NOCLIENT      0x80000000 /* owner
connect bit on but no client
                                    cache entry or client
                                    down */
#define FS_UNOWNED_CONNECTS         0x40000000 /*
unowned with nonzero connect mask */
#define FS_SINGLE_CONNECTS          0x20000000 /* single
entry with nonzero connect
                                    mask */
#define BAK_UNOWNED_CONNECTS        0x10000000 /*
```

TABLE 9-continued

```
unowned with nonzero connect mask */
#define BAK_SINGLE_CONNECTS            0x08000000 /* single
entry with nonzero connect
                                       mask */
#define UNOWNED_CONNECTFLAG            0x04000000 /*
unowned with nonzero connect flag */
#define SINGLE_CONNECTFLAG             0x02000000 /* single
entry with nonzero connect
                                       flag */
    int reserved;
    int flag;                                     /* non-
error flags */
#define HAD_XMITFAIL                   0x80000000
#define FS_UNOWNED                     0x40000000
#define ERROR_XMITFAIL_CONSISTENT      0x20000000
    unsigned int cache_entry_count; /* count of systems with
a cache entry */
    short cache_entry_mask[16];     /* list of systems with
a cache entry */
    unsigned int attach_count; /* count of systems with the
filesys attached */
    short attach_mask[16];          /* list of systems with the
filesys attached */
    unsigned int quiesce_count; /* count of systems with the
filesys quiesced */
    short quiesce_mask[16];         /* list of systems with the
filesys quiesced */
    unsigned int otherstate_count; /* count of systems with
the filesys in another curstate */
    short otherstate_mask[16];      /* list of systems with
the filesys in another curstate */
    unsigned int owner_mismatch_count; /* count of systems
with owner mismatches */
    short owner_mismatch_mask[16]; /* list of systems with
owner mismatches */
    unsigned int sysadmin_multiple_FSs_count; /* count of
systems with cache entry for
        the filesys, owner is sysadmin */
    short sysadmin_multiple_FSs_mask[16]; /* list of systems
with cache entry, owner is
                                       sysadmin */
    unsigned int unowned_growing_mismatch_count; /* count of
systems where filesys unowned
                                       but filesys is growing */
    short unowned_growing_mismatch_mask[16]; /* list of
systems where FS unowned but
                                       filesys is growing */
    unsigned int rw_mismatch_count; /* count of systems
where RW flag does not match */
    short rw_mismatch_mask[16]; /* list of systems where RW
flag does not match */
    unsigned int hasbak_mismatch_count; /* count of systems
where HAS_BAK flag does not
                                       match */
    short hasbak_mismatch_mask[16]; /* list of systems where
HAS_BAK flag does not match */
    unsigned int growing_mismatch_count; /* count of systems
where GROWING flag does not
                                       match */
    short growing_mismatch_mask[16]; /* list of systems
where GROWING flag does not match*/
    unsigned int dynmove_mismatch_count; /* count of systems
where DYNMOVE flag does not
                                       match */
    short dynmove_mismatch_mask[16]; /* list of systems
where DYNMOVE flag does not match*/
    unsigned int nodynmove_mismatch_count; /* count of
systems where NODYNMOVE flag does
                                       not match */
    short nodynmove_mismatch_mask[16]; /* list of systems
where NODYNMOVE flag does not
                                       match */
    unsigned int monitor_mismatch_count; /* count of systems
where MONITOR flag does not
                                       match */
    short monitor_mismatch_mask[16]; /* list of systems
where MONITOR flag does not match*/
    unsigned int grow_mismatch_count; /* count of systems
where GROW flag does not match */
    short grow_mismatch_mask[16]; /* list of systems where
```

TABLE 9-continued

GROW does not match */
    unsigned int nbs_mismatch_count; /* count of systems where NBS flag does not match */
    short nbs_mismatch_mask[16]; /* list of systems where NBS flag does not match */
    unsigned int curstate_mismatch_count; /* count of systems where CURSTATE flag does not
                  match */
    short curstate_mismatch_mask[16]; /* list of systems where CURSTATE flag does not
                  match*/
    unsigned int fsstate_mismatch_count; /* count of systems where FSSTATE flag does not
                  match */
    short fsstate_mismatch_mask[16]; /* list of systems where FSSTATE flag does not match*/
    unsigned int bakstate_mismatch_count; /* count of systems where BAKSTATE flag does not
                  match */
    short bakstate_mismatch_mask[16]; /* list of systems where BAKSTATE flag does not
                  match*/
    unsigned int threshold_mismatch_count; /* count of systems where THRESHOLD flag does
                            not match */
    short threshold_mismatch_mask[16]; /* list of systems where THRESHOLDflag does not
                  match */
    unsigned int increment_mismatch_count; /* count of systems where INCREMENT flag does
                  not match */
    short increment_mismatch_mask[16]; /* list of systems where INCREMENT flag does not
                  match */
    unsigned int movepct_mismatch_count; /* count of systems where MOVEPCT flag does not
                  match */
    short movepct_mismatch_mask[16]; /* list of systems where MOVEPCT flag does not match*/
    unsigned int moveint_mismatch_count; /* count of systems where MOVEINT flag does not
                  match */
    short moveint_mismatch_mask[16]; /* list of systems where MOVEINT flag does not match*/
    unsigned int movemin_mismatch_count; /* count of systems where MOVEMIN flag does not
                  match */
    short movemin_mismatch_mask[16]; /* list of systems where MOVEMINflag does not match */
    unsigned int fstokid_mismatch_count; /* count of systems where FSTOKID flag does not
                  match */
    short fstokid_mismatch_mask[16]; /* list of systems where FSTOKID flag does not match*/
    unsigned int baktokid_mismatch_count; /* count of systems where BAKTOKID flag does not
                  match */
    short baktokid_mismatch_mask[16]; /* list of systems where BAKTOKID flag does not
                  match*/
    unsigned int fsid_mismatch_count; /* count of systems where FSID flag do not match */
    short fsid_mismatch_mask[16]; /* list of systems where FSID flag does not match */
    unsigned int bakid_mismatch_count; /* count of systems where BAKID flag does not
                  match*/
    short bakid_mismatch_mask[16]; /* list of systems where BAKID flag does not match */
    unsigned int fs_ownerconn_clientnoconn_count; /* count of systems where owner connect
                            bit on but client flag off */
    short fs_ownerconn_clientnoconn_mask[16]; /* list of systems where owner connect bit
                  on but client flag off */
    unsigned int fs_ownernoconn_clientconn_count; /* count of systems where owner connect
                            bit off but client flag on */
    short fs_ownernoconn_clientconn_mask[16]; /* list of systems where owner connect bit TABLE 9-continued

```
                                    off but client flag on */
        unsigned int bak_ownerconn_clientnoconn_count; /* count of systems where owner connect
                                    bit on but client flag off */
        short bak_ownerconn_clientnoconn_mask[16]; /* list of systems where owner connect bit
                                    on but client flag off */
        unsigned int bak_ownernoconn_clientconn_count; /* count of systems where owner connect
                                    bit off but client flag on */
        short bak_ownernoconn_clientconn_mask[16]; /* list of systems where owner connect bit
                                    off but client flag on */
        unsigned int fs_ownerconn_noclient_count; /* count of systems where owner connect bit
                                    on but no client entry or
                                        client down */
        short fs_ownerconn_noclient_mask[16]; /* list of systems where owner connect bit on
                                    but no client entry or client
                                        down */
        unsigned int bak_ownerconn_noclient_count; /* count of systems where owner connect bit
                                    on but no client entry or
                                        client down */
        short bak_ownerconn_noclient_mask[16]; /* list of systems where owner connect bit on
                                    but no client entry or client
                                        down */
        unsigned int fs_unowned_connects_count; /* count of systems where unowned filesys has
                                    nonzero connect mask */
        short fs_unowned_connects_mask[16]; /* list of systems where unowned filesys has
                                    nonzero connect mask */
        unsigned int bak_unowned_connects_count; /* count of systems where unowned FS has
                                    nonzero connect mask */
        short bak_unowned_connects_mask[16]; /* list of systems where unowned FS has nonzero
                                    connect mask */
        unsigned int unowned_connectflag_count; /* count of systems where unowned FS has
                                    connect flag on */
        short unowned_connectflag_mask[16]; /* list of systems where unowned FS has connect
                                    flag on */
        unsigned int single_connectflag_count; /* count of systems where single FS has
                                    connect flag on */
        short single_connectflag_mask[16]; /* list of systems where single FS has connect
                                    flag on */
        unsigned int fsdevno_mismatch_count; /* count of systems where the fs devno does not
                                    match */
        short fsdevno_mismatch_mask[16]; /* list of systems where the fs devno does not
                                    match*/
        unsigned int bakdevno_mismatch_count; /* count of systems where the bak devno does not
                                        match */
        short bakdevno_mismatch_mask[16]; /* list of systems where the bak devno does not
                                        match*/
        unsigned int had_xmitfail_count; /* count of systems which had an XMIT failure */
        short had_xmitfail_mask[16]; /* list of systems which had an XMIT failure */
        unsigned int growing_count; /* count of systems with the growing bit set */
        short growing_mask[16];    /* list of systems with growing bit set */
        unsigned int nobak_count;   /* count of systems with no .bak for filesys */
        short nobak_mask[16];    /* list of systems with no .bak for filesys */
} BADFS;
Copyright 2009 IBM
```

TABLE 10 send_getxmit_fail

1. For each remote system, send a GET_XMITFAIL message.
2. Upon receipt of a GET_XMITFAIL message, each remote system returns an array of file system names that encountered a communication failure on an administration command that affected that file system.
3. Upon receipt of the replies, the validator adds the file systems returned to the local list of file systems with communication failures, ensuring there are no duplicate entries. (At this point the validator system has a complete list of all file systems that had some sort of XCF communication failure while an administration command was being processed for it in the sysplex).

TABLE 11 get_fs_list

1. Obtain storage for a ready_item array, whose entries correspond 1-1 with the systems in the ready_systems list. This array points to the corresponding NS_ITEM the system reported during the query process and represents that system's view of the file system.
2. For each system s, in the ready_systems list (including the UNOWNED system), loop:
   a. For each row r of the hash table corresponding to system s, loop:
      i. Loop processing each file system F in the hash row r:
         1. if F is already in L, loop to process the next file system.
         2. Initialize the ready_item array for F by looping through row r of each hash table, saving the corresponding NS_ITEM address (if it exists) in the corresponding slot of the ready_item array.
         3. Loop through the ready_item array and if any system indicates the existence of a bad clone, ensure that the clones are not considered when making the consistency checks. Remove information about clones from all entries in the ready_item array.
         4. Find the SYSTEM structure that represents the owner of the file system, and then the corresponding index o in the ready_systems list of the system that owns the file system. This is the owner index into the arrays.
         5. Initialize a BADFS structure, I, used to represent an inconsistent file system and it will be added to the inconsistent list L if F is determined to be inconsistent.
         6. If F is on the list of file systems with communication failures, set the HAD_XMITFAIL flag in I.
         7. Increment cache_entry_count and set the cache_entry bitmask in structure I by looping through the ready_item array. This mask will contain a 1 bit for each system with a local mount for F.
         8. Verify that all systems agree on the owner by looping through the ready_item array. If there is an owner mismatch, set OWNER_MISMATCH flag in I and then use GRS to help determine the real owner or to determine that there is no owner. Update owner index o as necessary.
         9. If the owner index o does not represent the unowned system (hence the file system is indeed owned):
            a. Ensure that the owning system has a local mount for F and if not:
               i. update I
                  1. set the BAD_OWNER flag
                  2. increment restart_system_count
                  3. set the bit representing the owner in restart_system_mask
               ii. add I to L
               iii. loop to process the next file system (step 2.a.i). This inconsistency can only be corrected by restarting the owner. There is no need to determine all inconsistencies for F.
            b. Ensure that the owning system actually thinks they own the file system and if not
               i. update I
                  1. set the BAD_OWNER flag
                  2. increment restart_system_count
                  3. set the bit representing the owner in restart_system_mask
               ii. add I to L
               iii. loop to process the next file system (step 2.a.i). This inconsistency can only be corrected by restarting the owner. There is no need to determine all inconsistencies for this file system.
            c. If F is mounted R/W and the owner system does not support multi-system read-write mounts, ensure that only one system has an entry in its local namespace for F and if not:
               i. update I
                  1. set the SYSADMIN_MULTIPLE_FSS flag
                  2. increment sysadmin_mulitple_FSs_count
                  3. set the bit representing the system with the unexpected

TABLE 11-continued get_fs_list mount in sysadmin_mulitple_FSs_mask bitmask
      ii. Note that the clients systems with local mounts are noted in cache_entry_mask in I and also as non-NULL entries in the ready_item array.
10. If the file system is only mounted on one sysplex member (only one entry in ready_item array for file system):
    a. If the owner thinks any other system has it mounted (hence owner has non-zero connected_mask bitmasks in its NS_ITEM) set the FS_SINGLE_CONNECTS flag in I indicating the connection inconsistency. Issue a message indicating that this owner thinks there are clients with local mounts.
11. If the file system is unowned
    a. Verify that all systems have zero connected_mask bitmasks and zero NS_FS_CONNECTED and NS_BAK_CONNECTED flags. If this is not true:
      i. update the following flags in I based on the NS_FS_CONNECTED and NS_BAK_CONNECTED flags:
        1. set the FS_UNOWNED_CONNECTS and/or BAK_UNONWED_CONNECTS flags accordingly.
        2. increment fs_unowned_connects_count and/or bak_unowned_connects_count
        3. set the bit representing the system with the non-zero connect in fs_unowned_connects_mask and/or bak_unowned_connects_mask bitmasks
      ii. Issue a message indicating there are systems that think they have a connection to an unowned file system.
      iii. continue checking for inconsistencies
    b. Verify that the NS_FS_GROWING flag is zero in all systems. If this is not true:
      i. update I
        1. set UNOWNED_GROWING flag
        2. increment unowned_growing_mismatch_count
        3. set the bit representing the system with the growing flag on in unowned_growing_mismatch_mask bitmask in I.
      ii. Issue a message indicating there are systems which think an unowned file system is growing.
      iii. Continue checking for inconsistencies.
12. For each system that has file system F in its local namespace (F in the ready_item array). (The following masks are used by correction to quickly determine which systems need to be told to unquiesce a file system or what other types of corrections need to be made to a particular system.):
    a. increment/set the quiesce_count/mask in I if the file system is quiesced on this system.
    b. Increment/set the attach_count/mask in I if the file system is cached on this systems
    c. increment/set the other_count/mask in I if the file system is in any other state on this system.
    d. Increment/set the growing_count/mask in I if the NS_FS_GROWING bit is set on this system
    e. Increment/set the nobak_count/mask in I if the NS_FS_HAS_BAK bit is not set on this system.
    f. Make sure their misc. attributes and file system state are identical. For each system that is not the same as the owner, update I:
      i. set RW_MISMATCH, rw_mismatch_count/mask if NS_FS_RW does not match
      ii. set HASBAK_MISMATCH, hasbak_mismatch_count/mask if NS_FS_HAS_BAK does not match
      iii. set GROWING_MISMATCH, growing_mismatch_count/mask if NS_FS_GROWING does not match
      iv. set DYNMOVE_MISMATCH, dynmove_mismatch_count/mask if NS_DYNMOVE does not match
      v. set NODYNMOVE_MISMATCH, nodynmove_mismatch_count/mask if NS_NODYNMOVE does not match
      vi. set MONITOR_MISMATCH, monitor_mismatch_count/mask if NS_MONITOR does not match
      vii. set GROW_MISMATCH, grow_mismatch_count/mask if NS_GROW does not match
      viii. set NBS_MISMATCH, nbs_mismatch_count/mask if NS_NBS does not match
      ix. set CURSTATE_MISMATCH, curstate_mismatch_count/mask if curstate does not match
      x. set FSSTATE_MISMATCH, fsstate_mismatch_count/mask if state does not match
      xi. set BAKSTATE_MISMATCH, bakstate_mismatch_count/mask if bak_state does not match
      xii. set THRESHOLD_MISMATCH, TABLE 11-continued get_fs_list threshold_mismatch_count/mask if threshold does not match
xiii. set INCREMENT_MISMATCH, increment_mismatch_count/mask if increment does not match
xiv. set MOVEPCT_MISMATCH, movepct_mismatch_count/mask if movepct does not match
xv. set MOVEINT_MISMATCH, moveint_mismatch_count/mask if moveint does not match
xvi. set MOVEMIN_MISMATCH, movemin_mismatch_count/mask if movemin does not match
xvii. set FSTOKID_MISMATCH, fstokid_mismatch_count/mask if fs_tokid does not match
xviii. set BAKTOKID_MISMATCH, baktokid_mismatch_count/mask if bak_tokid does not match
xix. set FSID_MISMATCH, fsid_mismatch_count/mask if fs_id does not match
xx. set BAKID_MISMATCH, bakid_mismatch_count/mask if bak_id does not match g. If there is a mismatch, issue a message naming the first system that does not match the owner. The message would include the name of the file system, the name of the owning system, the name of the client system and either the 2 byte flags field (from the NS_ITEM) on each system or the inconsistent state field on each system.

13. For each system that is not the owner of the file system:
a. Make sure that if the owner thinks the client is connected to the file system (or its clone) that the client systems consider themselves connected. If the owner and client connection information does not match, set the following inconsistency flags in I and note the offending client in a bitmask in I.
   i. For each client system with the NS_FS_CONNECTED and/or NS_BAK_CONNECTED flag off
      1. if the bit for this system is on in the owner's connected_mask bitmask
         a. update FS_OWNERCONN_CLIENTNOCONN, fs_ownerconn_clientnoconn_count/mask or BAK_OWNERCONN_CLIENTNOCONN, bak_ownerconn_clientnoconn in I
   ii. For each client system with the NS_FS_CONNECTED and/or NS_BAK_CONNECTED flag on
      1. if the bit for this system is off in the owner's connected_mask bitmask
         a. update FS_OWNERNOCONN_CLIENTCONN, fs_ownernoconn_clientconn_count/mask or BAK_OWNERNOCONN_CLIENTCONN, bak_ownernoconn_clientconn in I
b. Issue a message for the first discrepancy found. This message will either indicate the owner thinks a client has a mount where the client does not or where a particular client reports a mount but the owner does not think it is mounted on that client.

14. If flags in I indicate the file system is inconsistent, add the file system to the list of inconsistent file systems by adding I to the linked list. Otherwise, remove the NS_ITEM for file system F from all hash tables as it is now viewed as consistent. Loop (to step 2.a.i) to process the next file system.

3. Free the ready_item array storage.
4. Return the list of inconsistent file systems L to the caller.

TABLE 12 trim_xmit_failure

1. Loop for each inconsistent file system, F in L:
   a. If xmit_fail bit is set in F:
      i. Verify that the only inconsistencies are:
         1. Ownership related due to communication problems sending UNOWNED, TAKEOVER, or CLONE messages
         2. Connection related due to communication problems sending CONNECT and DISCONNECT messages
         3. Quiesce related due to communication problems sending QUIESCE and UNQUIESCE messages TABLE 12-continued trim_xmit_failure ii. If there are other inconsistencies, reset the xmit_fail state flag for F. F will not be eligible for correction using algorithms for communication failures.

TABLE 13 check_down_systems

1. Broadcast a PING message to all ready sysplex members
2. If any system fails to reply, return error. The caller of this routine, (retrieve_namespace), will then restart validation.

TABLE 14 correct_namespace

1. If there are inconsistencies resulting from communication failures, correct them first. After taking these corrective actions return to the caller and restart validation.
    a. For each file system F in L with a state inconsistency and the HAD_XMITFAIL flag on (inconsistency due only to communication failures):
        i. If the validator (the local system that is performing this correction) reports the file system is quiesced, locally unquiesce the file system.
        ii. For each remote system reporting the file system quiesced, send an UNQUIESCE message.
            1. the remote recipient will unquiesce the file system.
        iii. If unable to send the message because the remote system is down or there were communications problems sending the UNQUIESCE message, return to the caller and start new a validation.
        iv. Reset the state inconsistency flags in F
    b. For each file system F in L with a GROWING inconsistency and the HAD_XMITFAIL flag on:
        i. If the validator reports the GROWING attribute on, reset the GROWING attribute for the file system in the local system's namespace FILESYS structure.
        ii. For each remote system reporting the GROWING attribute on, send a GROW_STOP message.
            1. ← The remote recipient will clear its GROWING indication from its local FILESYS structure.
        iii. If there is a communication failure sending GROW_STOP, or if the remote system is down, return to the caller and start a new validation.
        iv. Reset the GROWING_MISMATCH flag in F.
    c. For each file system F in L with an OWNER_MISMATCH inconsistency and the HAD_XMITFAIL flag on (no system should hold the GRS enqueue for the file system)
        i. If the validator believes the file system has an owner, locally quiesce and move the file system to the unowned list
        ii. For each remote system reporting an owner, send a TAKEOVERFAIL message.
            1. The remote system will quiesce the file system and moves the file system to the unowned list.
        iii. If unable to send the message due to a communication failure, or because the remote system is down, return to the caller and start a new validation.
        iv. Reset the OWNER_MISMATCH flag in F
    d. For each file system F in L with a clone (HASBAK_MISMATCH) inconsistency and HAD_XMITFAIL on:
        i. If the validator does not have a clone, create a namespace entry (update FILESYS) for the clone in the local system's namespace.
        ii. For each remote system not reporting a clone, send a CLONE message.
            1. the remote recipient will update its namespace with a FILESYS structure representing the clone.
        iii. If unable to send the message due to a communication failure, or because the remote system is down, return to the caller and start a new validation.
        iv. Reset the HASBAK_MISMATCH flag in F
    e. For each file system F in L with a connection inconsistency and HAD_XMITFAIL on (the owner reports systems connected which are not connected):
        i. For each client system where the corresponding connected_mask bitmask is on but the client NS_FS_CONNECTED and/or NS_BAK_CONNECTED flag is off or the client does not have a mount (no NS_ITEM entry)
            1. If the validator is the owner, process a disconnect for the file system on the local system for the remote client that should not have a connection.
            2. Otherwise send the remote owner a DISCONNECT indicating which system requires a disconnection from the file system.
                1. the remote recipient will process a disconnection for the remote client system specified.
            3. If unable to send the message due to a communication failure or because the remote system is down, return to the caller and start a new validation.
            4. Reset the various connection inconsistency flags in F.
2. If there are no inconsistencies due only to communication failures, attempt to fix file system inconsistencies by restarting systems. When a system is restarted all inconsistencies are usually eliminated. Limit the number of systems restarted to: NumRestart = MIN(2, Number of plex members/2). If the validating system must be restarted, it is restarted last (and when it restarts it performs a validation ensuring the process is continued). Remote systems are restarted by sending an ABORT message to them and these systems will abort and then restart zFS. After restarting systems (in the case where the validator is not restarted), return to the caller (retrieve_namespace) and start a new validation.
    a. Make a list of the systems with inconsistent file systems. Bitmasks describe the inconsistencies and the systems on which they occurred. For instance, there is a bitmask for a state inconsistency, curstate_mismatch_mask. If the owner thinks the file system is quiesced, this state bitmask will have a 1 bit for each client that does not think the file system is quiesced. Inspect all the TABLE 14-continued correct_namespace bitmasks for all the file systems in L and if any bit for a system is on, add it to
   the list of systems to restart.
   b. If the number of systems with inconsistent file systems is <= NumRestart,
      restart them by sending them an ABORT message, restarting the validator
      last.
   c. Otherwise, look only at the systems with ownership inconsistencies,
      specifically those with OWNER_MISMATCH on. If the number of these
      systems is <= NumRestart, restart them.
   d. Otherwise, restart all owning systems which disagree with GRS for any file
      system. These systems are noted in restart_system_mask. They either do not
      have a mount for the file system they are supposed to own or they do not think
      they own them. These systems must be restarted so the NumRestart limit is
      ignored. Note that at this point, if there are no inconsistencies involving GRS,
      no systems will be restarted. (Note that this step is unnecessary if GRS is not
      used in the process of determining the correct owner, GRS is optional to the
      algorithm and this step).
3. If inconsistencies could not be fixed by restarting systems, attempt to fix the
inconsistencies on a file system basis. For each inconsistent file system F, left in the list
L:
   a. Validate the mount status for each inconsistent file system with USS. Validate
      the mount status of the owner last. Note that the owner may be a remote
      system relative to the validator system.
      i. For each remote system that thinks it has a mount, i.e., each system that
         has an NS_ITEM for the file system
         1. Send that system a CHECK_MOUNT message to ensure the file
            system is removed from the remote namespace if USS has no record of
            a mount.
            1. The remote recipient will call USS osi_ctl(getmntstatus) to
               determine if USS thinks the local file system is mounted. If not then
               the local system will un-mount that file system (FILESYS),
               performing all necessary cleanup from its namespace. (Note that the
               osi_ctl is simply a query of the USS local cache; hence its
               namespace).
         2. If unable to send the message because the remote system is down, or
            due to a communication failure, return to the caller indicating
            validation needs to be restarted.
      ii. If the validator thinks it has a mount, i.e., the validator has an NS_ITEM
          for the file system
          1. Query USS via a call to osi_ctl(getmntstatus) to ensure USS thinks the
             file system is locally mounted
          2. If USS indicates the file system is not locally mounted, un-mount the
             file system (FILESYS) from the local namespace performing all
             necessary cleanup to ensure the file system no longer exists in the local
             namespace
      iii. If the above actions resulted in the file system F being removed from the
           namespace on all sysplex members, then F no longer exists in the
           namespace, hence remove F from L.
   b. For each file system F in L with only a state inconsistency:
      (CURSTATE_MISMATCH, FSSTATE_MISMATCH,
      BAKSTATE_MISMATCH)
      i. If the validator reports the file system is quiesced, locally unquiesce the
         file system.
      ii. For each remote system reporting the file system (either the primary or its
          clone) quiesced:
          1. Send an UNQUIESCE message to the system indicating the name of
             the file system to unquiesce.
             1. The remote recipients will unquiesce the file system.
          2. If unable to send the message due to a communication failure or
             because the remote system is down, return to the caller indicating
             validation needs to be restarted
      iii. Reset the CURSTATE_MISMATCH, FSSTATE_MISMATCH
           BAKSTATE_MISMATCH flags in F
   c. Check the local SYSTEM structures one more time for down systems. If any
      system on ready_systems list is now down, return to the caller and start a new
      validation.
   d. For each file system F, remaining in L, attempt to fix inconsistencies by re-
      mounting. Essentially, the preceding three steps ensured that no zFS sysplex
      member has the file system in its namespace if it's not locally mounted.
      Furthermore, the file system state is consistent across the sysplex. By
      ensuring that the USS and zFS namespace is consistent with respect to F, un-
      mount and then re-mount the file system to correct the problem. The un-
      mount sequence, described earlier in this document will send an un-mount to
      all sysplex members which will ensure the file system F is not in any zFS
      namespace. The subsequent mount is therefore starting "clean" and should
      ensure proper consistency. Both the file system and its clone must be un-
      mounted and re-mounted during this process.
      i. If F is quiesced, ensure the file system is unquiesced across the sysplex.
         1. If the validator has a mount for it, locally unquiesce the file system.

TABLE 14-continued correct_namespace

2. For each remote system with a mount for the file system (indicated by connect bit-masks in the entry F in the inconsistent file systems list L):
   1. Send an UNQUIESCE message to the system indicating the name of the file system to unquiesce.
      1. The remote recipient will unquiesce the file system.
   2. If unable to send the message due to a communication failure, or because the remote system is down, return to the caller and start a new validation.
ii. Broadcast a sysplex wide REMOUNT_START message indicating a remount is in progress for the file system. When a remount is in progress, reject any manual attempts to mount the file system or its clone and any other commands targeted to that file system. Thus only allow the internal re-mount that is being initiated. This is to handle the case where some user decides to un-mount or mount the file system or its clone coincidentally at the same time the correction is running, the user's mount or unmount attempt is rejected.
iii. Find a system from which a remount can be issued. Remounts can only be issued from systems that have a local mount. Preference is given to the validator.
   1. Drop sysplex serialization. Release the sysLock and the IOEZNS resource.
   2. If the remount must be issued from a remote system send a REMOUNT message with the name of the file system to re-mount to the remote system.
      1. The remote recipient will issue an osi_ctl(remountsamemode) to initiate the re-mount process for the clone (if its mounted) and then the primary file system..
   3. Else (the validator will issue the remount):
      1. Call USS via osi_ctl(remountsamemode) to remount the clone if it is mounted and then to remount the primary file system. (Since the intent of a remount is to ensure the file system is removed from the namespace before adding it again to the namespace, the associated mount for the clone will be rejected until the primary file system is unmounted. This means that if both a file system and its clone are mounted before correction, only the primary file system will be mounted after correction via remount.)
   4. Re-obtain sysplex serialization:
      1. Enqueue the IOEZNS resource exclusive
      2. Lock sysLock in write mode.
4. Return to the caller and start a new validation. The caller of this routine is responsible for freeing storage for the temporary hash tables and the inconsistent file system list, L.

TABLE 15 system_down

1. Lock sysLock
2. set as_state flag in SYSTEM structure to AS_PARTIALLY_DOWN to indicate the system is down and a system-down for that system on the local system is being processed.
3. Issue a message showing the name of the system that went down.
4. Wakeup tasks that are waiting for system-down notification from XCF
5. For each file system previously owned by down system:
a. Quiesce (for takeover) all user activity for the file system
b. Move file system to the unowned list
6. Dispatch a task to continue system-down processing—this will perform takeover processing and unquiesce file systems owned by the local system that were quiesced by the system that went down (the down system had originated a backup of the file system).
7. Release sysLock.

What is claimed is:

1. A method comprising:

sending an instruction from a validator member processor system of a sysplex to a second member processor system of the sysplex to prevent operations that alter a sysplex namespace;

determining whether the validator member processor system of the sysplex is communicative with the second member processor system of the sysplex and whether the member processor systems of the sysplex retain current sysplex status information;

sending an instruction from the validator member processor system to the second processor system to send first namespace attribute data associated with the second member processor system to the validator member processor system responsive to determining that the validator member processor system of the sysplex is communicative with the second member processor system of the sysplex and that the member processor systems of the sysplex retain current sysplex status information;

determining whether the first namespace attribute data associated with the second member processor system is consistent with second namespace attribute data;

sending an instruction to correct the first namespace attribute data responsive to determining that the first namespace attribute data associated with the second member processor system is not consistent with the second namespace attribute data; and determining whether a sysplex member processor system has lost communication with the sysplex;

determining whether the validator member processor system of the sysplex is communicative with the second processor system of the sysplex and whether the member processor systems of the sysplex retain current sysplex status information responsive to determining that a sysplex member processor system has lost communication with the sysplex; and resending the instruction from the validator member processor system to the second member processor system to send first namespace attribute data associated with the second member processor system to the validator member processor system responsive to determining that the validator member processor system of the sysplex is not communicative with the second member processor system of the sysplex and that the member processor systems of the sysplex do not retain current sysplex status information.

2. The method of claim 1, wherein the method includes sending an instruction from the validator member processor system of the sysplex to the second member processor system of the sysplex to allow operations that alter the sysplex namespace responsive to determining that the first namespace attribute data associated with the second member processor system is consistent with the second namespace attribute data.

3. The method of claim 1, wherein determining whether the first namespace attribute data associated with the second member processor system is consistent with second namespace attribute data includes:
generating a first hash table of the first namespace attribute data;
generating a second hash table of the second namespace attribute data; and
comparing the first hash table with the second hash table.

4. The method of claim 1, wherein the first namespace attribute data includes a ready state of a file system.

5. The method of claim 1, wherein the first namespace attribute data includes an identifier of a clone associated with a file system.

6. The method of claim 1, wherein the first namespace attribute data includes a processing attribute of a file system.

7. A method comprising:
receiving an instruction to correct inconsistent first namespace attribute data associated with a second member processor system of a sysplex;
sending an instruction from a validator member processor system to the second member processor system of the sysplex to send a list of file systems associated with a sysplex communication error to the validator member processor system;
determining whether the inconsistent first namespace attribute data corresponds to a sysplex communication error;
sending an instruction including corrected first namespace attribute data to the second member processor system of the sysplex responsive to determining that the first namespace attribute data corresponds to a sysplex communication error;

determining whether a sysplex member processor system has lost communication with the sysplex;

determining whether the validator member processor system of the sysplex is communicative with the second member processor system of the sysplex and whether the member processor systems of the sysplex retain current sysplex status information responsive to determining that a sysplex member processor system has lost communication with the sysplex; and sending an instruction to correct inconsistent first namespace attribute data associated with a second member processor system of a sysplex responsive to determining that the validator member processor system of the sysplex is not communicative with the second member processor system of the sysplex and that the member processor systems of the sysplex do not retain current sysplex status information;

determining whether a number of sysplex member processor systems having inconsistent namespaces is greater than a threshold value responsive to determining that the inconsistent first namespace attribute data does not correspond to a sysplex communication error;

shutting down the second member processor system of the sysplex responsive to determining that the number of sysplex member processor systems having inconsistent namespaces is less than the threshold value; and starting the second member processor system of the sysplex.

8. The method of claim 7, wherein the method further comprises replacing the inconsistent first namespace attribute data with the corrected first namespace attribute data.

9. The method of claim 8, wherein the method includes sending an instruction from the validator member processor system to the second member processor system of the sysplex to allow operations that alter the sysplex namespace responsive to replacing the inconsistent first namespace attribute data with the corrected first namespace attribute data.

10. The method of claim 7, wherein the method further comprises:
determining whether a number of sysplex member processor systems having inconsistent namespaces are greater than a threshold value responsive to determining that the inconsistent first namespace attribute data does not correspond to a sysplex communication error; and
correcting the inconsistent first namespace attribute data responsive to determining that the number of sysplex member processor systems having inconsistent namespaces is greater than the threshold value.

11. The method of claim 10, wherein correcting the inconsistent first namespace attribute data includes:
sending an instruction to unmount a first file system associated with the inconsistent first namespace attribute data;
sending an instruction to purge all data structures associated with the first file system; and
sending an instruction to the second member processor system of the sysplex to mount the first file system.

12. The method of claim 7, wherein the first namespace attribute data includes a ready state of a file system.

13. The method of claim 7, wherein the first namespace attribute data includes an identifier of a clone associated with a file system.

14. The method of claim 7, wherein the first namespace attribute date includes a processing attribute of a file system.

15. A system comprising, a validator member of a sysplex operative to send an instruction to a second member of the sysplex to prevent operations that alter a sysplex namespace, determine whether the validator member of the sysplex is communicative with the second member of the sysplex and whether the members of the sysplex retain current sysplex status information, send an instruction to the second member to send first namespace attribute data associated with the second member to the validator member responsive to determining that the validator member of the sysplex is communicative with the second member of the sysplex and that the member of the sysplex retain current sysplex status information, determine whether the first namespace attribute data associated with the second member is consistent with second namespace attribute data, sending an instruction to correct the first namespace attribute data responsive to determining that the first namespace attribute data associated with the second member is not consistent with the second namespace attribute data, determining whether a sysplex member processor system has lost communication with the sysplex, determining whether the validator member processor system of the sysplex is communicative with the second processor system of the sysplex and whether the member processor systems of the sysplex retain current sysplex status information responsive to determining that a sysplex member processor system has lost communication with the sysplex, and resending the instruction from the validator member processor system to the second member processor system to send first namespace attribute data associated with the second member processor system to the validator member processor system responsive to determining that the validator member processor system of the sysplex is not communicative with the second member processor system of the sysplex and that the member processor systems of the sysplex do not retain current sysplex status information.

16. The system of claim 15, wherein the validator member is further operative to send an instruction to the second member of the sysplex to allow operations that alter the sysplex namespace responsive to determining that the first namespace attribute data associated with the second member is consistent with the second namespace attribute data.

17. The system of claim 15, wherein determining whether the first namespace attribute data associated with the second member is consistent with second namespace attribute data includes:

generating a first hash table of the first namespace attribute data;

generating a second hash table of the second namespace attribute data; and comparing the first hash table with the second hash table.

* * * * *